Patented Aug. 25, 1936

2,052,239

UNITED STATES PATENT OFFICE 2,052,239

MATERIAL FOR USE IN OIL REFINING AND METHOD OF MAKING IT

Ralph W. Miller, Barberton, Ohio, assignor to Pittsburgh Plate Glass Company, a corporation of Pennsylvania No Drawing. Application April 29, 1933, Serial No. 668,633

1 Claim. (Cl. 252—1)

This invention relates to the production of sodium plumbite or "doctor" solution possessing novel properties from waste caustic alkali liquors.

"Doctor" solution is used by the petroleum industry for treating their products in a step called the "sweetening" process. At present "doctor" solution is made by agitating an approximately twenty-five (25%) per cent hot caustic soda solution with litharge which results in an alkaline solution of sodium plumbite. In preparing such solutions it is desired to dissolve as much litharge as possible; however, the maximum solubility is about five (5%) per cent.

In the manufacture of rayon by the viscose process, raw cellulose is first steeped in an approximately eighteen (18%) per cent caustic soda solution. The excess alkali is removed therefrom and constitutes the rayon waste caustic liquor. This liquor contains in addition to the caustic soda several per cent of impurities which are mostly organic and probably consist of cellulosic materials, resins and the like. Thus far these impurities have been very difficult to remove from the caustic at a cost low enough to be commercially feasible.

I have found that a "doctor" solution possessing novel properties can be prepared from this rayon waste liquor. The procedure is similar to that of regular practice except that a precipitate containing organic matter and lead forms and may be removed by filtration or otherwise. By burning this precipitate, either metallic lead or litharge results depending on the amount of air accessible. The litharge used in forming this precipitate is not lost but may be recovered by this method and used for the treating of a further portion of waste caustic liquor. The filtrate, which constitutes my "doctor" solution, will contain considerably more lead than that prepared from a pure caustic soda solution of the same concentration of NaOH as evidenced by the examples A and B set forth below.

The following examples illustrate the use of rayon waste caustic liquor in the production of my "doctor" solution:

*Example A.*—One thousand parts by weight of rayon waste caustic liquor containing 15.5% NaOH and the usual amount of impurities were heated to near its boiling point, after which 150 parts by weight of litharge were added. After agitating for a few minutes, the precipitate which formed and the excess litharge were removed by centrifuging and decanting off the clear sodium plumbite solution. Analysis showed this solution to contain about 9% PbO even when cooled to 70° F. A 15.5% pure caustic soda solution treated in a similar manner contained only 4.0% PbO at 200° F. and 2.6% PbO at 70° F. After standing for thirty (30) days, the "doctor" solution prepared from rayon waste caustic liquor contained 4.2% PbO. This decrease was due to a slow crystallization of PbO which took place.

*Example B.*—One thousand parts by weight of rayon waste caustic liquor containing 15.5% NaOH and the usual amount of impurities were concentrated by adding 127 parts by weight of solid caustic soda so that the concentration of NaOH was increased to 25%. This liquor was then heated to near its boiling point and 200 parts by weight of litharge were added. After agitating a few minutes, the precipitate which formed and the excess litharge were removed by centrifuging and decanting off the clear sodium plumbite solution. Analysis showed this clear solution to contain about 11.7% PbO even when cooled to 70° F. A 25% pure caustic soda solution treated in a similar manner contained 5% PbO at 200° F. and 2.3% PbO at 70° F. After standing for thirty (30) days at 70° F. this doctor solution contained 8.6% PbO. The high content of PbO resulting from the process is believed to be due to a certain amount of organic material which remains in the caustic soda solution and which tends to increase the amount of litharge held in colloidal suspension.

This invention is useful because "doctor" solutions containing several-fold more PbO than usual may be economically prepared from a cheap source of waste alkali. This also affords an opportunity for the disposal of such waste caustic liquors.

Although this invention is described in conjunction with the preparation of "doctor" solution from rayon waste caustic liquor, it is not limited thereto but also includes the use of waste caustic liquors from other steeping processes as well as the use of pure caustic soda solutions treated to give properties such as those of rayon waste caustic liquor. The term "doctor" solution is intended to include solutions resulting from the treatment of caustic soda solutions with litharge. By rayon waste caustic liquor I mean the product derived from the steeping operation in the viscose process for making rayon.

What I claim is:

A doctor solution comprising PbO and impure rayon waste as it comes directly from the viscose process containing in part substantially 15.5% caustic soda, said doctor solution containing from about 4.2–9% of PbO at 70 degrees F.

RALPH W. MILLER.